UNITED STATES PATENT OFFICE.

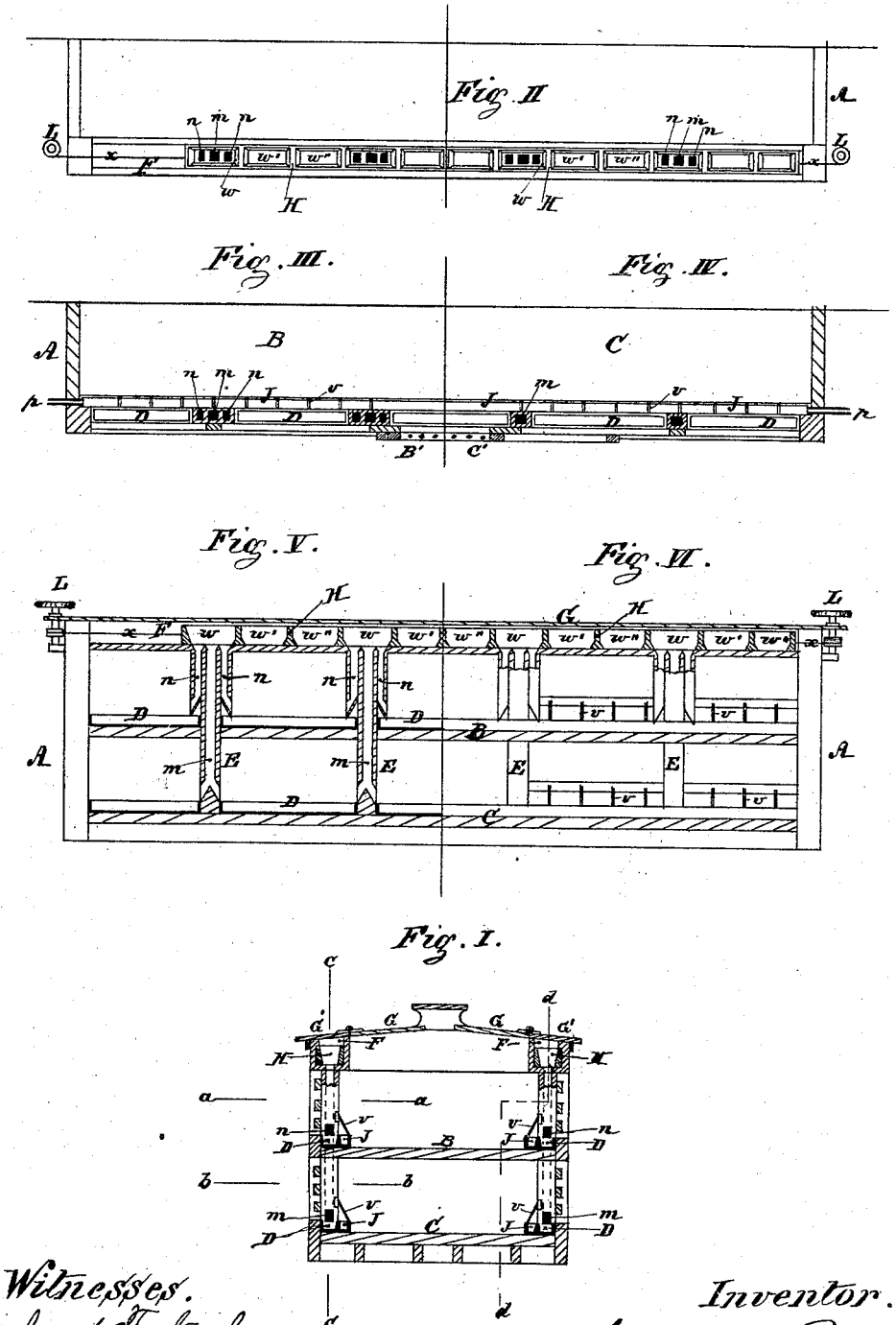

SAMUEL W. REMER, OF BRIDGEPORT, CONNECTICUT, ASSIGNOR TO CHILD & OLIVER, OF NEW YORK, N. Y.

STOCK-CAR.

SPECIFICATION forming part of Letters Patent No. 263,219, dated August 22, 1882.

Application filed May 20, 1882. (No model.)

*To all whom it may concern:*

Be it known that I, SAMUEL W. REMER, of Bridgeport, in the State of Connecticut, a citizen of the United States, have invented a new and useful Improvement in Stock-Cars, being an arrangement for feeding animals in stock-cars on railways, of which the following is a specification.

My invention relates to the construction of a stock-car having facilities for feeding animals *in transitu* without unloading for that purpose and while the car is in motion.

My invention consists in the arrangement of troughs, one on each side of the car, extending throughout the length of the car, directly under the roof or cover of the car, into which suitable grates or frames are fitted to slide, open at top and bottom. On the floor or floors of the car the feeding-troughs are arranged, and chutes or feeding-passages run from the upper trough near the roof of the car, passing through the upright posts or timber forming the frame of the car, and close to the sides of the same, to enable food to be precipitated to the troughs below whenever desired, and constituting at the same time ventilators to induce circulation of air upward from the car. The frames or grates fitted in the upper troughs are divided by regular partitions into bins, each bin holding about the required quantity for one feeding, and every second, third, or fourth bin corresponding or coinciding with the mouths of the feeding-passages. By this arrangement, after one set of bins has discharged its contents through the feeding-passages into the lower trough or troughs, at the next time the animals require to be fed the grate or frame is moved so that the next set of bins come over the mouths of the feeding-passages to discharge their contents through the same into the lower troughs, which operation, it will be perceived, can be performed while the car is in motion.

In the accompanying drawings, Figure I represents a transverse section of a stock-car arranged with a double floor for carrying hogs, and embodying my invention. Fig. II represents a top view of one-half of a car. Fig. III is a horizontal section at line *a a*, Fig. I. Fig. IV is a horizontal section at line *b b*, Fig. I. Fig. V is a vertical section at line *c c*, Fig. I, and Fig. VI is a vertical section at line *d d*, Fig. I.

Similar letters represent similar parts in all figures.

A represents the body of the car, of proper size and material. The sides and ends of the car are made with slats, which may be arranged to turn, so as to open or close, or arranged in any desired manner. The car here represented has two floors, B and C, with central sliding doors, B' C', for the introduction and removal of the stock, which as here shown is intended for hogs, sheep, or other small animals.

At the sides of the car, on each floor, are troughs D and J—the inner troughs, J, to receive water or other liquid and the outer troughs, D, to receive dry feed. The inner troughs, J, on each floor connect with each other by means of suitable pipes, and may be supplied with water or other liquid through a branch or nozzle, *p*, projecting through the end of the car, arranged to have an india-rubber or flexible tube attached at the watering-station; or a water-tank may be arranged on the top of the car under the roof near the eaves, directly adjoining the feed-bins, to supply the troughs J with water or other liquid whenever required. The troughs J extend the entire length of the car, crossing the doorways, and can easily be covered over when the car is loaded or unloaded. The troughs D are arranged in the walls of the car, of such size and form as will best economize space and facilitate the objects for which they are intended. They occupy the space between the frame-posts E, so that they will occupy but very little space of the interior of the car. Fender bars or guards *n* are arranged over the troughs J to prevent the animals from getting into the troughs, but which allow the stock to drink and feed without hinderance.

At the top of the car, at each side, troughs F F are arranged at the eaves and close under the roof or cover G, made accessible from the roof by suitable covers, G', hinged to the car-roof G. From these troughs F F feed-passages *m n n* are arranged, the passages *m* passing through the frame-posts E and discharging into the troughs D on the lower floor, and the feed-passages n n are arranged on each side of said frame-posts E and discharge into the troughs D on the upper floor.

Into the troughs F, which extend the whole length of the car, frames or grates H are fitted, capable of moving in said troughs F. These frames H are divided, forming bins $w$ $w'$ $w''$, open at top and bottom, the bottom of the trough F forming the bottom of these cavities or bins. To the ends of the frames H cords or chains $x$ are attached, fastened to wheels on upright spindles L, arranged at the ends of the car, whereby these frames H may be moved forward or backward in the troughs F, as may be desired. By this arrangement the several bins $w$ $w'$ $w''$ in the frame H can be filled with a fixed amount of feed before starting on the voyage from the top of the car, and are then discharged into the troughs in the interior of the car on each floor, whenever it is required to feed the animals while in transit, by moving the frame H so that the next filled bins are brought over the mouths of the feeding-passages m n n, to be discharged through the same into the troughs on the floors of the car whenever the animals require to be fed again, and by the next feeding-time the frame H is again moved so that the adjoining and filled bins come over the mouths of the feeding-passages, to be discharged in the same manner. The supply for each time of feeding the animals is therefore uniform, and is regulated by the size and capacity of the bins, and can be all arranged before starting on the voyage. The troughs F F are arranged at each side of the car, under the eaves of the roof, where they offer the least obstruction, and the covers G' may be hinged or slide. These covers should be so arranged and divided that that part directly over the mouths of the passages m n n may be opened independent of the other parts or sections for the purpose of giving ventilation. The feed-passages, being arranged within and on the sides of the frame-posts E, offer very little obstruction.

By the division of the frame H into a series of bins the required quantity of grain or other food for several days can be carried, and the necessary portion can be fed equally and as nearly simultaneously as possible while in transit without being obliged to stop the car, or for the attendant to get within the car for that purpose.

What I claim as my invention, and desire to secure by Letters Patent, is—

1. In stock-cars, the series of horizontally-sliding bins above the walls of the car, each bin containing sufficient food for one feeding and discharging into the feeding-troughs during transit, substantially as described.

2. In combination with troughs F, extending under the eaves of the roof of the car, and the feed-passages m n n, the sliding frame H, divided into regular bins $w$ $w'$ $w''$, the whole being arranged to operate substantially in the manner and for the purpose set forth.

3. In combination with the trough F and the feeding-passages m n n, the sliding frame H, divided into regular bins, carrying together several days' supply of feed, and arranged to so operate in relation to the mouth of the feeding-passages that two or more bins shall discharge into said feeding-passages simultaneously, in the manner and for the purpose substantially as herein described.

4. In combination with the trough F, with sliding frame H, and the troughs D D on the floors of the car, the feeding-passage m, passing through the frame-post E, and the feeding-passages n n on the sides of the frame-post E, substantially as and for the purpose herein described.

In testimony whereof I have hereunto signed my name to this specification in the presence of two subscribing witnesses.

SAMUEL W. REMER.

Witnesses:
 ALBERT M. TALLMADGE,
 CURTIS THOMPSON.